(12) United States Patent
Marie

(10) Patent No.: US 10,321,660 B2
(45) Date of Patent: Jun. 18, 2019

(54) DRIVING SPROCKET FOR A MARINE-TYPE CHAIN

(71) Applicant: Vincent Marie, Granville (FR)

(72) Inventor: Vincent Marie, Granville (FR)

( * ) Notice: Subject to any disclaimer, the term of this patent is extended or adjusted under 35 U.S.C. 154(b) by 0 days.

(21) Appl. No.: 15/748,435

(22) PCT Filed: Jul. 19, 2016

(86) PCT No.: PCT/FR2016/051863
§ 371 (c)(1),
(2) Date: Jan. 29, 2018

(87) PCT Pub. No.: WO2017/017346
PCT Pub. Date: Feb. 2, 2017

(65) Prior Publication Data
US 2018/0213743 A1    Aug. 2, 2018

(30) Foreign Application Priority Data

Jul. 27, 2015   (FR) ...................................... 15 01603
Jul. 28, 2015   (FR) ...................................... 15 57204

(51) Int. Cl.
*B65G 23/06*   (2006.01)
*B65G 19/20*   (2006.01)
(Continued)

(52) U.S. Cl.
CPC ......... *A01K 1/0132* (2013.01); *F16H 55/303* (2013.01); *F16H 2055/363* (2013.01)

(58) Field of Classification Search
None
See application file for complete search history.

(56) References Cited

U.S. PATENT DOCUMENTS 4,645,476 A * 2/1987 King ...................... F16H 7/06
                                                      198/834
4,917,234 A * 4/1990 Seymour ................ B65G 23/06
                                                      198/509
(Continued)

FOREIGN PATENT DOCUMENTS

DE   102011055216 A1   5/2012
EP       2430913 A1   3/2012
(Continued)

OTHER PUBLICATIONS

International Search Report dated Nov. 14, 2016, for corresponding International Application No. PCT/FR2016/051863, filed Jul. 19, 2016.

(Continued)

*Primary Examiner* — Kavel Singh
(74) *Attorney, Agent, or Firm* — David D. Brush; Westman, Champlin & Koehler, P.A.

(57) ABSTRACT

A driving sprocket for a marine-type chain whose links have a section of diameter between 8 and 20 millimeters, intended to be used in the agricultural field. The sprocket includes a main cylindrical recess between two lateral flanges and a plurality of regularly spaced forks projecting radially from the recess, delineating housings intended for receiving every other link of the substantially flat chain. The flanges extend beyond the recess over a height substantially equal to the width of a link of the chain.

9 Claims, 3 Drawing Sheets

(51) Int. Cl.
  *A01K 1/01* (2006.01)
  *F16H 55/30* (2006.01)
  *F16H 55/36* (2006.01)

(56) References Cited

U.S. PATENT DOCUMENTS

| | | |
|---|---|---|
| 8,435,146 B2 | 5/2013 | Chiu |
| 2004/0261205 A1 | 12/2004 | Berg |
| 2008/0153645 A1 | 6/2008 | Chiu |

FOREIGN PATENT DOCUMENTS

| | | | |
|---|---|---|---|
| FR | 2343175 A1 | 9/1977 | |
| FR | 2991551 A1 | 12/2013 | |
| GB | 912908 A | 12/1962 | |
| GB | 1329027 A | 9/1973 | |

OTHER PUBLICATIONS

English translation of the Written Opinion of the International Searching Authority dated Nov. 21, 2016, for corresponding International Application No. PCT/FR2016/051863, filed Jul. 19, 2016.
International Search Report dated Oct. 17, 2016, for corresponding International Application No. PCT/FR2016/051862, filed Jul. 19, 2016.
English translation of the Written Opinion of the International Searching Authority dated Oct. 24, 2016, for corresponding International Application No. PCT/FR2016/051862, filed Jul. 19, 2016.
French Search Report and Written Opinion dated May 18, 2016 for corresponding French Application No. 1501602, filed Jul. 27, 2015.
French Search Report and Written Opinion dated Jun. 6, 2016 for corresponding French Application No. 1557204 filed Jul. 28, 2015.

* cited by examiner

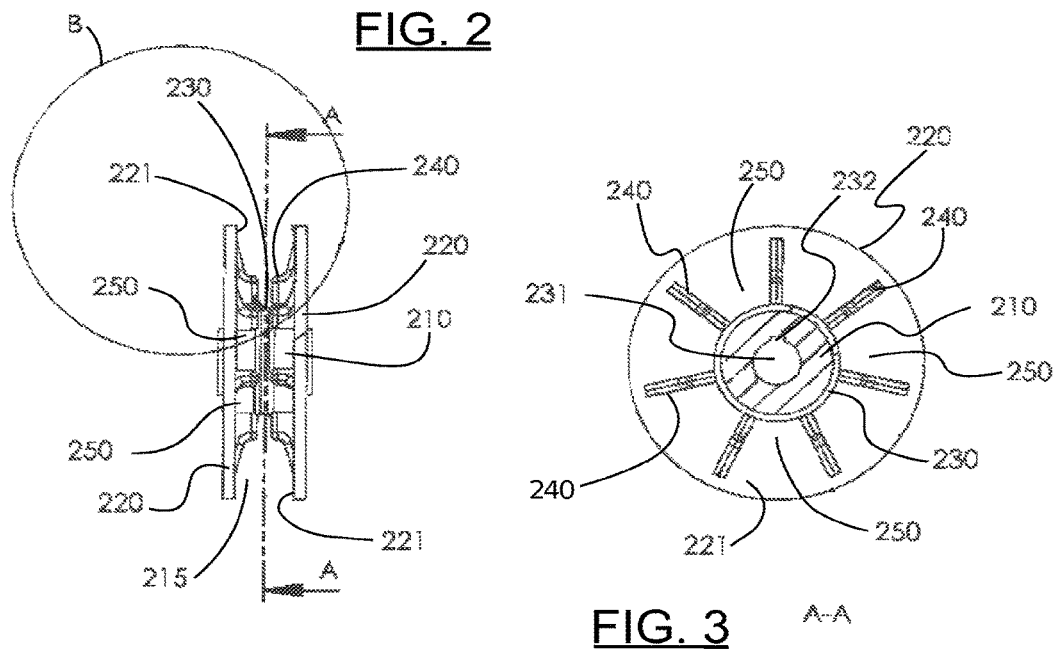
FIG. 2
FIG. 3
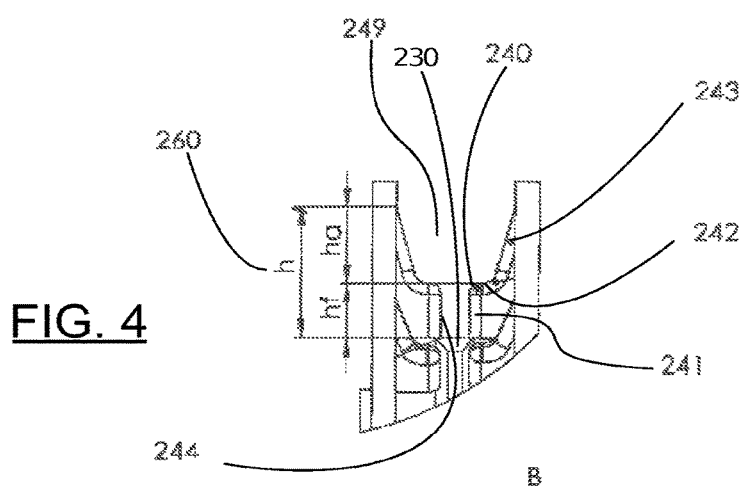
FIG. 4

DRIVING SPROCKET FOR A MARINE-TYPE CHAIN

CROSS-REFERENCE TO RELATED APPLICATIONS

This Application is a Section 371 National Stage Application of International Application No. PCT/FR2016/051863, filed Jul. 19, 2016, which is incorporated by reference in its entirety and published as WO 2017/017346 A1 on Feb. 2, 2017, not in English.

1. FIELD OF THE INVENTION

The invention relates to the field of agricultural machinery.

More particularly, the invention relates to a driving sprocket for a marine type chain.

The invention finds particular application in the chain drive of the planer scrapers for pushing slurry, soft manure, straw or thick manure outside corridors or stables in a cowshed.

2. STATE OF THE ART

Different type of driving chains, for example square chain, roller chain, silent chain or still marine-type chain, are known.

Among them, the marine chain is inexpensive and robust, which makes it interesting for use in the agricultural sector.

For transmitting a movement from an engine to a marine chain, it is known to use a sprocket with cylindrical or star-shaped indentations.

A sprocket with cylindrical indentations generally comprises on its crown chain link indentations and a recess. When a portion of the chain is engaged on a pocket sprocket, one link in two is arranged flat on pockets, whereas the others links are received partially accommodated in the recess, on the side.

This type of transmission using a pocket sprocket and a marine chain is commonly used in the formation of scrapers for cleaning the corridors of livestock buildings soiled by the presence of manure or slurry, to limit the risk of foot diseases, contamination of the udders of animals in the herd and limit the release of ammonia. The document FR 2 991 551 describes, for example, a chain scraper of this type.

The use of a pocket sprocket requires multiple links to be engaged in the pockets and positioned perfectly flat at the bottom of the pockets, so as to form a winding arc sufficient for it to be properly driven.

This technique using pocket sprockets has many shortcomings.

The chain and the sprocket must be perfectly aligned, failing which they will come off the pockets, or in other words they might derail. Another shortcoming of this technique is that the links of the chain, which are subjected to repeated tractions, will relax with time, thereby inducing an elongation of the chain. The pockets of the sprockets are no longer shaped to fit the links in the chain which then will come off and/or slip. This disadvantage is all the more critical as the chain is immersed in slurry and carries solid waste, such as straw manure which will grease or obstruct the pockets.

The chain can also twist, or jump from the sprocket, rendering inoperative the scraping device, which requires maintenance intervention. This phenomenon is all the more important as the chain is insufficiently stretched.

3. OBJECTS OF THE INVENTION

The object of the invention is in particular to remedy the shortcomings of the state of the art mentioned above.

More specifically, the object of the invention is to provide a marine type chain driving sprocket wheel, intended to be used in the agricultural field, which is reliable over time and which limits the upkeep as well as maintenance interventions and operations.

An object of the invention is also to provide a driving sprocket which remains engaged with a soiled chain, even by a thick manure, or with a twisted chain, without coming off or derailing.

An object of the invention is also to provide a driving sprocket which allows to continue driving a chain that has elongated with time.

Another object of the invention is to provide such a driving sprocket that is simple to install, and with reduced cost price.

4. SUMMARY OF THE INVENTION

These objects, as well as others that will appear later are achieved by means of a driving sprocket for a marine-type chain, the links of which have a section with diameter between 8 and 20 millimeters, intended to be used in the agricultural field, comprising a main cylindrical recess between two lateral flanges and a plurality of regularly spaced forks projecting radially from said recess, delineating housings intended for receiving every other link of said substantially flat chain.

According to the invention, the flanges extend beyond the recess over a height substantially equal to the width of a link of the chain.

With these specifications, the chain is effectively maintained in the sprocket and does not come off, even when it is not perfectly aligned with the sprocket or when it carries manure waste made of straw that will take up a lot of space in the housings.

In addition, the portion of the chain in the sprocket can be twisted, that is to say rotate about its longitudinal axis by one or more turns, without the chain coming off.

In addition, the links can relax with use and the chain may elongate without affecting the operation. Indeed, when the chain is new, the length of the links is shorter than when the chain is worn. The length of the housings delineated by the forks increases with the radial distance. Thus, a link of a new chain penetrates deeper into the housing than a worn link. But in both cases, the new or worn link remains in contact with at least one of the forks delineating its housing which transmits the traction force applied by a motor.

According to particular embodiments of the invention, the driving sprocket which is the subject of the invention comprises one or more of the following characteristics, according to any operative technical combination.

Advantageously, the flanges extend beyond the recess over a height greater than or equal to 40 mm, preferably greater than or equal to 50 millimeters.

According to a particular embodiment of the invention, the flanges extend beyond the recess over a height ranging between 30 millimeters and 40 millimeters.

According to a particularly advantageous embodiment of the invention, the driving sprocket as described above is made of steel. The result is a sprocket which is resistant and little brittle.

According to a preferred embodiment of the invention, forks are spaced apart by a distance substantially equal to that of a link in the chain.

Thus, the chain is regularly meshed with the sprockets.

It should be noted that it is sufficient for a single link to be engaged, that is to say bearing on a fork so that the chain is pulled by this link, over a distance corresponding substantially to the winding arc of the chain on the driving sprocket.

According to particular embodiments of the invention, the forks are formed of two teeth spaced from 15 to 30 millimeters.

Thus, we can use the driving sprocket with marine chains, with a section diameter of the links followed by the pitch (expressed in mm) equal respectively to 9×27, 10×30, 10×35, 12×32, 12×36, 13×49, 14×42, 14×50, for example.

Advantageously, a secondary recess is formed in the main recess, between the teeth of said forks.

So, the links of the chain are maintained better, even in case of fouling of housings with waste.

According to a particular embodiment of the invention, the driving sprocket comprises braking means comprising a portion of a cylindrical shaft projecting from the outer face of one of the flanges, aligned with the axis of the sprocket.

According to an advantageous embodiment of the invention, the driving sprocket comprises securing means with a driving shaft comprising an axial bore into which emerges a keyway.

The driving sprocket can thus be secured reliably without clearance with the driving shaft of a motor or a geared motor, optionally via a coupling means, and can be disassembled easily.

The use of the verb "include" or "contain» and its conjugate forms does not exclude the presence of other elements or steps different from those set out in a claim. The use of the indefinite article "a" or "an" for an element does not exclude, unless otherwise stated, the presence of a plurality of such elements.

5. LIST OF FIGURES

Other features and advantages of the invention will become evident on reading the following description of one particular embodiment of the invention, given by way of illustrative and non-limiting example only, and with the appended drawings among which:

FIG. 2 is a side view of a driving sprocket for a marine chain according to the invention;

FIG. 3 is a sectional view along section A-A of the driving sprocket shown with reference to FIG. 2;

FIG. 4 is a detailed view of a fork of the driving sprocket shown in FIG. 2;

1. DETAILED DESCRIPTION OF THE INVENTION

Figure 5:
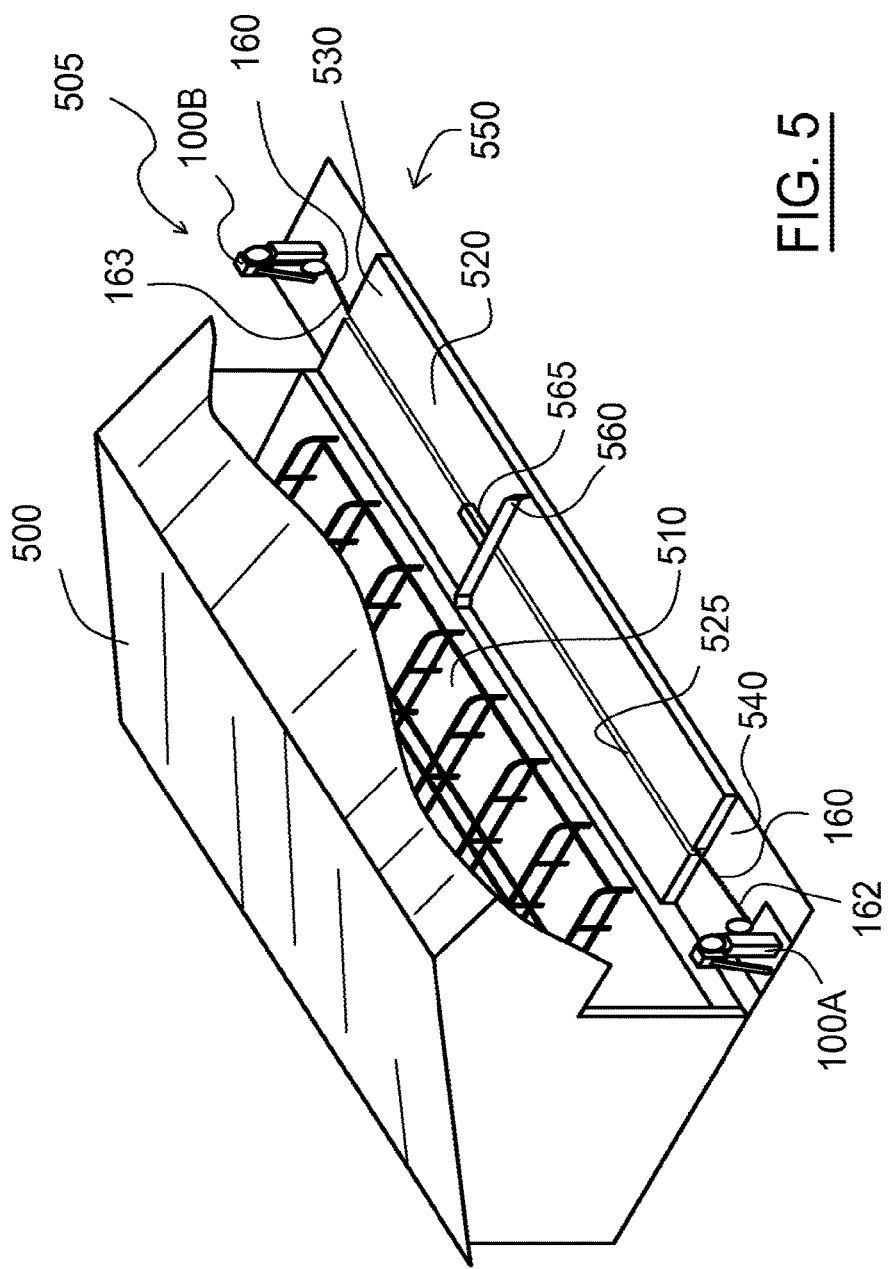
FIG. 5 is a schematic perspective view of a manure and/or slurry scraper.

On FIG. 5, there is illustrated a scraper 550 fitting a barn 500 including a space of stalling 510 and a corridor 520.

The scraper 550 is formed of a surfacer 560 driven in translation by a device 505, comprising two traction modules 100A and 100B complementary identical and a chain 160 fixed in its middle to the planer 560.

The traction modules 100A and 100B are arranged at each end of the corridor 520 to clean. One of both traction modules 100A is intended to pull the plane 560 so that it pushes the garbage littering the corridor 520 towards a pit at one end 540 of the corridor, while the other module 100B is adapted to pull and thus bring the planer back to its original parking position 530, located at the other end of the corridor.

During his displacement, the planer 560 is guided by a slider 565 cooperating with a guide recess 525 formed in the floor of the corridor 520. When one of the traction modules 100A or 100B is activated, it tows the planer while tensioning the part of chain 160 which is called a stretched strand 162, the second traction module 100 is inactive, allowing the chain part 163 forming a soft strand to run freely.

Thus, whatever the direction of movement of the plane 560, it is pulled by either of the traction modules 100A or 100B.

Figure 1:
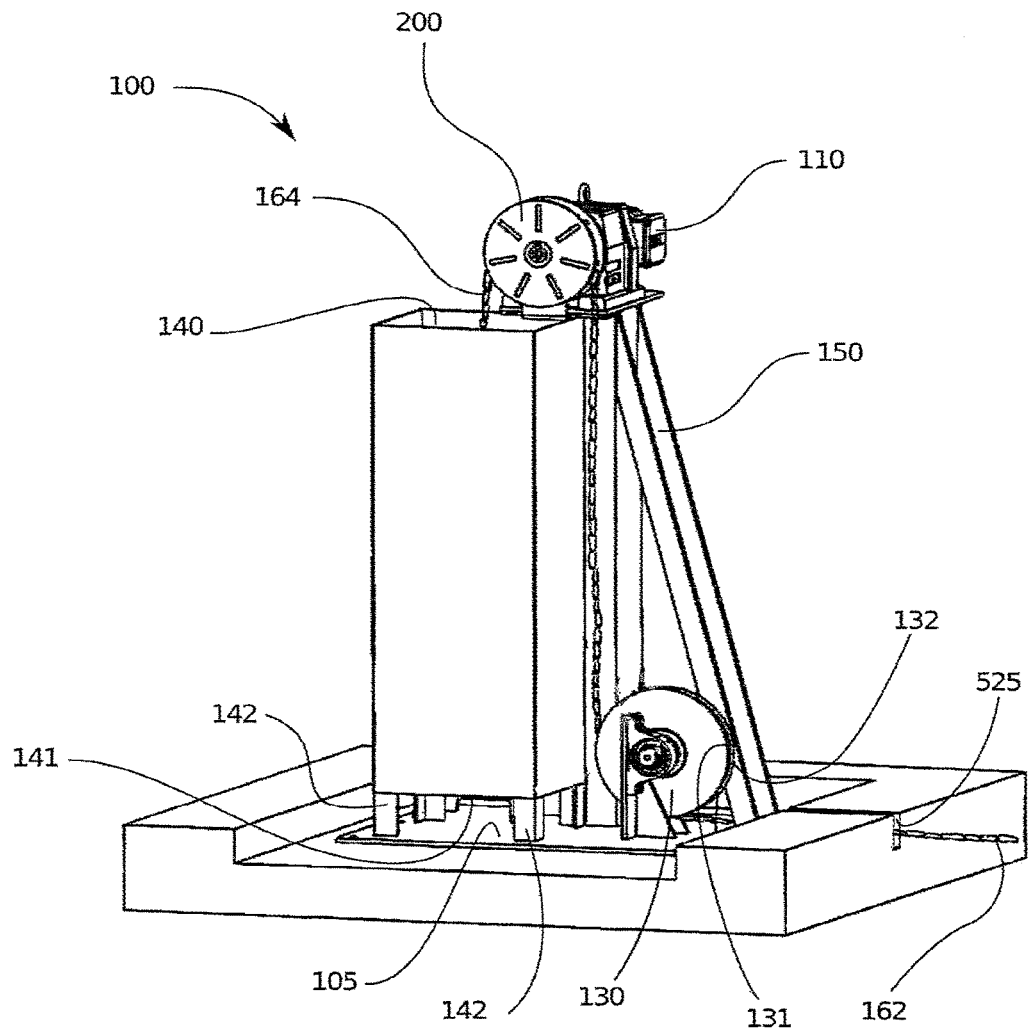
FIG. 1 is a perspective view of a scraper traction module presented with reference to FIG. 5.

On FIG. 1, the traction module 100A has been represented in a detailed view.

The traction module 100A comprises a chassis 150 mounted on a base 105, supporting at its top a geared motor 110 on the shaft of which is mounted a driving sprocket 200 arranged vertically to an idler pulley 130 and a chain box 140, also called tub.

The pulley 130 is mounted on the base 105, substantially at ground level and is aligned with the guide recess 525 of the planer, formed in the floor of the corridor 520.

The part of the chain 162, fixed to the planer, comes out of the guide recess 525 of the planer and the pulley 130 returns it to the sprocket 200. At the outlet of the sprocket 200, the chain portion 164 is stored in the tub 140.

The pulley 130 has a guide recess 132 shaped to maintain the chain 160 in place at best. This recess 132 has a width substantially greater than that of a link in the chain 160 and a depth substantially equal to half the width of the link.

To ensure that the chain 160 is properly pulled by the traction module 100A, the winding arc of the chain 160 around the sprocket 200 is greater than 90°. Advantageously, this winding arc ranges between 120° and 180° and preferably between 145° and 180°.

Finally, to allow the dirty chain to drip during storage in the tub 140, the bottom 141 of the tub 140 is perforated and raised by feet 142. The perforated bottom 141 allows, in addition, the evacuation of rainwater which otherwise would accumulate in the tub 140 when the traction module 100A is located outside a building.

To pull the planer 560 towards the end 540, a control module supplies electricity to the geared motor of the traction module 100A and switches off the power supply of the geared motor of the traction module 100B, which becomes inactive. Conversely, to return the planer 560 to the parking position 530, the control module cuts off the power supply of the geared motor of the traction module 100A and supplies power to the geared motor of the traction module 100B, which becomes active.

According to one variation, a mechanical coupling, such as a clutch for example, is mounted between the motor shaft of the geared motor 110 and the shaft carrying the sprocket 200. This mechanical coupling can be made temporarily inactive and allows to engage or disengage the sprocket 200 of the geared motor according to whether the traction module carrying it is activated or not. Thus, when the sprocket is disengaged, it becomes idle and lets the chain slip away. On the contrary, when the sprocket is engaged, it rotates at the speed of the shaft of the geared motor and pulls the chain.

On FIGS. 2 and 3, detailed views of a driving sprocket 200 are shown with which the traction modules 100A and 100B are fitted, with reference to FIG. 1, respectively from the side and in sectional view. The sprocket 200 is formed of a cylindrical hub, called a core 210 and two circular flanges 220, welded on the core 210 and delineating a first, also called main, recess 215.

In this particular embodiment of the invention, the flanges 220 extend beyond said groove over a height 260 of 45 millimeters.

To allow the engagement of the chain 160 by the sprocket 200, the flanges 220 comprise on the inside face 221 teeth 240 of radial orientation, spaced by a regular pitch. Both teeth 240 of the two flanges 220 are arranged facing each other, each pair of teeth forming a fork 249. Each tooth 240 of one of the forks 249 has a similar profile according to the axial orientation of the fixture, with a substantially constant width having two flanks with substantially parallel faces and rounded edges.

The tooth 240 of the fork 249 shown in detail in FIG. 4 has a height h according to the radial distance between a foot circle corresponding to the diameter $d_f$ of the cylinder forming the core 210 and a tip circle diameter $d_a$ delineating the top of the tooth 240 of the fork 249. This height h of the tooth 240 of the range 249 comprises a protrusion height $h_a$ and a recess height $h_f$.

The recess height $h_f$ corresponds in the proximal part 244 of the tooth 240 of the fork 249 to a base 241 of constant thickness. At approximately mid-height, the tooth 240 of the fork 249 has a thickness attenuation 242. This recess 242 is the beginning of a portion 243 corresponding to the projecting height $h_a$ in which the thickness decreases regularly to the distal end of the tooth 240 of the fork 249. In addition, the distal end of the tooth 240 is tangent to the inner face 221 of the flange 220.

The dimensions of the sprocket and the pitch between each tooth 240 of the forks 249 are based on the size of a mesh of the chain used. So, the thickness of the tooth 240 at the base 241 is such that between two teeth 240 facing the fork 249, there remains, perpendicular to the recess 230, a space of dimension substantially greater than or equal to the section of a link of the chain 160.

To ensure good maintenance of the chain in the fixture and to prevent the chain from coming off as far as possible, the tooth 240 of the fork 249 further comprises substantially parallel flanks 241 and 242. In addition, the internal faces 221 of the flanges 220 are substantially parallel.

Two successive forks 249 delimit a housing 250 for a link in the chain 160 to drive. The flanks 241 and 242 of the teeth 240 of the forks 249 then serve as a stop for the link of the chain 160 inserted into the housing, transmitting by contact the force produced by the geared motor to the chain 160 which is drawn.

Thanks to the housing thus formed, the chain can twist in the fixture 200, without coming off and so be dragged farther by the sprocket 200. Similarly, driving is ensured even if the chain is completely stretched, under the effect of traction.

To improve the engagement of the links of the chain in contact on the edge with the sprocket 200, a second recess 230 is formed on the core 210. This secondary recess 230 has a width dimension substantially greater than or equal to the section of a chain link and a depth substantially greater than or equal to half the section of a link.

The centering of the sprocket 200 on the motor shaft of the geared motor is provided by a central bore 231 formed and machined in the core 210. This core 210 comprises, in the axial direction of the bore, a keyway 232 to maintain the rotation by keying the fixture 200 on the shaft of the geared motor.

According to one variation, the core 210 of the sprocket 200 extends outside one of the flanges 220, along its axis, in the form of an outer cylindrical portion. This extension of the core makes it possible to equip the traction module with a brake in the form of a belt or a strap acting by friction on this outer cylinder.

According to another variation, the assembly formed of the core 210 and flanges 220 is cast by moulding.

The technique described above for making a driving sprocket for a chain can be used in different types of traction equipment or pulleys, for example to form a traction element of a chain of a lifting system or a docking system in a floating structure such as a ship, a platform or other.

Although the invention has been described in connection with several particular embodiments, it is obvious that it is not limited thereto and that it comprises all the technical equivalents of the means described and their combinations if they are within the scope of the invention.

The invention claimed is:

1. A driving sprocket for a marine-type chain whose links have a section of diameter between 8 and 20 millimeters, intended to be used in the agricultural field, the driving sprocket comprising:
   a main cylindrical recess between two lateral flanges, wherein said flanges extend beyond said recess on a height substantially equal to the width of a link of the chain; and
   a plurality of regularly spaced forks projecting radially from said recess, delineating housings configured to receive every other link of the chain in a position where the every other link is laid substantially flat,
   wherein each fork is made of two teeth and has two flanks with substantially parallel faces.

2. The driving sprocket according to claim 1, wherein said flanges extend beyond said recess over a height greater than or equal to 40 millimeters.

3. The driving sprocket according to claim 1, wherein the sprocket is made of steel.

4. The driving sprocket according to claim 1, wherein said forks are spaced apart by a distance substantially equal to that of a link of said chain.

5. The driving sprocket according to claim 1, wherein the two teeth are spaced apart by 15 to 30 millimeters.

6. The driving sprocket according to claim 5, wherein a secondary recess is formed in said main recess between the teeth of said forks.

7. The driving sprocket according to claim 1, further comprising a brake comprising a cylindrical shaft portion projecting from an outer face of one of said flanges, aligned with an axis of said sprocket.

8. The driving sprocket according to claim 1, further comprising a securing element with a driving shaft comprising an axial bore in which emerges a keyway.

9. The driving sprocket according to claim 2, wherein said flanges extend beyond said recess over a height greater than or equal to 50 millimeters.

* * * * *